H. McGUCKIN.
TRACTOR BELT.
APPLICATION FILED MAR. 27, 1917.
1,245,001.
Patented Oct. 30, 1917.
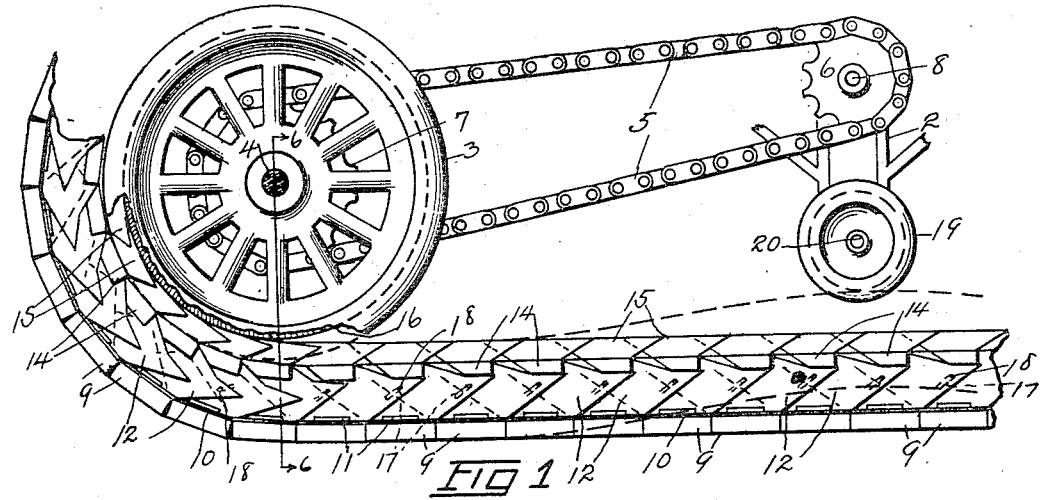
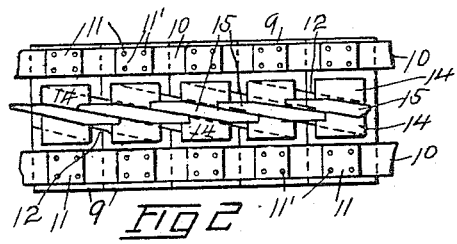
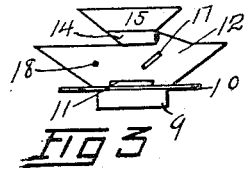
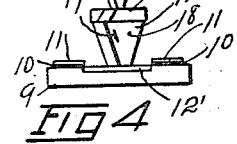
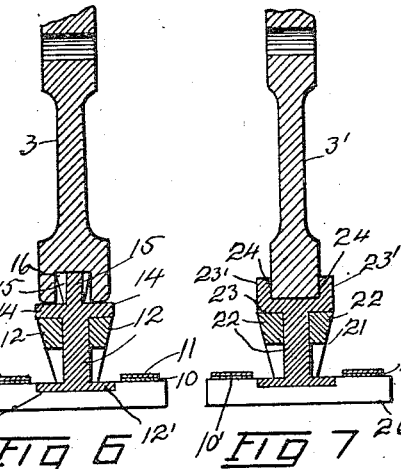
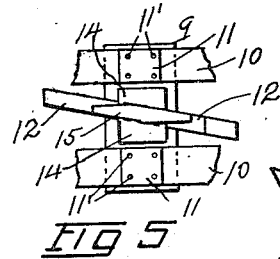
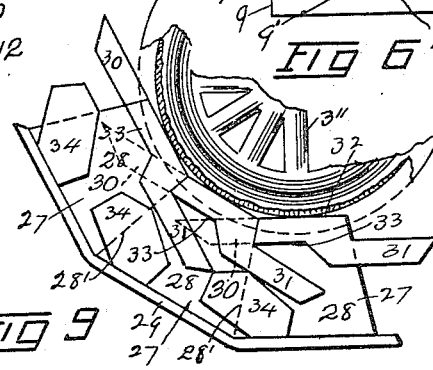
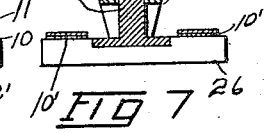
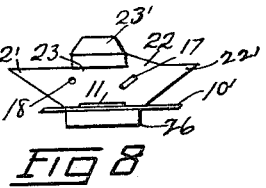
WITNESS
Clark M. Gray.
INVENTOR
Hugh McGuckin.
BY
Harry M Wallace
ATTORNEY

UNITED STATES PATENT OFFICE.

HUGH McGUCKIN, OF SYRACUSE, NEW YORK.

TRACTOR-BELT.

1,245,001.  Specification of Letters Patent.  Patented Oct. 30, 1917.

Application filed March 27, 1917. Serial No. 157,797.

*To all whom it may concern:*

Be it known that I, HUGH McGUCKIN, a citizen of the United States, residing at Syracuse, in the county of Onondaga and State of New York, have invented certain new and useful Improvements in Tractor-Belts, of which the following is a specification.

This invention relates to improvements in tractors, and has for its object to provide what is commonly known as a caterpillar tractor, designed especially for use in connection with any kind of self-propelled vehicles, to enable said vehicles to travel over soft, marshy or unbroken roads, as well as over plowed fields, ditches and the like. A particular object is to provide a pair of endless tractor belts comprising a plurality of novel and simple sections hinged or otherwise joined together, and capable of traveling over and around the opposite driving wheels of the vehicle, each of said sections having its own rail unit, which interfits with adjacent units, for providing an endless track upon which the wheels roll, and having relatively broad tread members, which contact with the earth or roadway, thus affording a broad and firm self-sustaining track for the driving and driven wheels of the vehicle to travel upon. A further object is to provide a spring connection or tie for the adjacent tread members to give suitable flexibility to the whole belt, as well as to afford simple and strong means for connecting the said sections. And a further object is to provide means for preventing undue strain upon the portions of the belts extending between the driving and driven wheels.

I attain these objects by the means set forth in the detailed description which follows, and as illustrated by the accompanying drawing, in which—

Fig. 1 is a broken side elevation of a motor truck and one of my tractor belts. Fig. 2 is a broken plan view of the tractor belt. Fig. 3 is a side elevation of one of the units of the belt. Fig. 4 is an end view of one of the units. Fig. 5 is a top plan view of one of the units or sections of the belt. Fig. 6 is a vertical cross-section taken on line 6—6 of Fig. 1. Fig. 7 is a sectional view of a modified belt construction. Fig. 8 is a side view of one of the units of the modified belt. Fig. 9 is a broken elevation of a modified form of belt, and Fig. 10 is a side elevation of one of the modified units.

In the drawing, 2 represents a part of the frame of a motor truck or like vehicle, and 3 represents one of the driving wheels which is journaled on the shaft 4. The wheels 3 may be driven by a chain 5, the latter traveling over sprockets 6 and 7. The sprocket 6 is mounted upon a shaft 8, which may be driven by an engine or other suitable power (not shown). I have shown but one of the driving wheels 3, but it is understood that a second wheel of the kind may be disposed at the opposite side of the sprocket 6. The wheels 3 are employed for supporting the tractor belts, as well as the vehicle, and being rotated by whatever power is employed for driving the vehicle, the said wheels frictionally engage the inner surfaces of the caterpillar belts and roll on the said belts as tracks. The wheels 3 may be disposed any suitable distance apart. Fig. 1 shows part of the construction and arrangement of but one side of the vehicle.

My caterpillar tractor is in the form of one or more endless belts, which will now be described in detail.

The tractor belts comprise a number of relatively narrow sections or units each consisting of a transversely disposed substantially flat tread member or slat 9. The adjacent parts 9 are secured together, in the preferred form, by a flat piece or strip of spring steel or other suitable flexible material 10. The springs 10 preferably overlap the joints between the tread members and are held in place and secured to the slats 9 by means of cleats 11 and rivets 11'. The springs 10 are disposed near the opposite ends of the members 9 so as to leave a clear space extending throughout the longitudinal center of the belt. The treads 9 may be made out of wood, iron or steel. Upon each of the tread members 9 is rigidly mounted a rail unit preferably made of malleable casting consisting of an angular upright web 12, having a flange base 12', which may be set in a recess or groove 9' in the top side of the tread member. The webs 12 are so positioned on the tread members that the opposite pointed ends of the webs overlap the adjacent webs (see Figs. 1 and 2), and the said webs are set at an angle to the lateral edges of the belt, as shown.

Between the top and the bottom edges of the webs 12, I provide oppositely facing lateral flanges 14, which are disposed parallel to the treads 9. The flanges 14 project far enough on each side to overlap the adjacent webs when the units are assembled, as shown in Figs. 1 and 2, and serve to prevent the points of the adjacent webs from getting out of line or level with the central web, when the belt is traveling over rocks or other uneven portions of the road. The top edge 15 of each web 12 constitutes the track or bearing for the wheels 3, and the track 15 is preferably integral with the web and the flanges 14, as best seen in Fig. 6. The tracks 15 are preferably angular in side elevation and come to a point at each end so as to permit the connected units to curl or coil around the wheels 3, the same as the webs 12 (see Figs. 1 and 3). The wheels 3 are preferably provided with peripheral grooves 16 which receive and frictionally engage the tracks 15, and the side flanges which form the said grooves also frictionally engage the flanges 14 (see Fig. 6). By this construction the wheels are not liable to become detached from the belt while the vehicle is in operation. Each web 12 has a slot 17 and also a pin 18 (see Fig. 3) and the slot 18 of one web is so arranged that the pin 17 of the adjacent web pierces and plays in the said slot, and in this way, according to the length of the slots 18, the sections 9 of the belt may be curled around a larger or smaller wheel (3) without cramping or straining the belt. The angularity of the pointed ends of the web also tend to limit the curling movement of the sections of the belt. The pins and slots referred to also tend to prevent the sections from pulling apart under the strain of operating over rough ground.

The wheels 3 are spaced a considerable distance apart and there is a relatively long stretch or portion of the belt in contact with the earth, which is liable to become strained or injured when the vehicle is traveling over rocks or other rough portions of the road. In order to protect this portion of the belt, I provide an idler wheel 19 for each belt, which is mounted upon a shaft 20 supported by the frame 2. The idlers 19 are normally spaced from the track units 15 as long as the road or bearing for the belt is level and smooth. But as soon as the road becomes rough, the belts will be forced upwardly against the idlers (as shown by dotted line in Fig. 1), and the latter will prevent undue straining of the said portions of the belts.

Figs. 7 and 8 illustrate a modified form of the tractor belt, which consists of a number of units or sections 21, each comprising a vertically disposed web 22 having pointed ends 22'. The tops of the webs 22 comprise horizontal laterally projecting shoulders 23 and upturned flanges 23' for providing a longitudinal groove or trough 24, in which the wheel 3' having a flat periphery rolls. The webs 22 have base flanges which are seated in corresponding recesses formed in the top surface of treads 26, which are similar to the treads 9. The treads 26 may be resiliently secured together by springs 10'. The pointed ends 22' of the adjacent webs engage the shoulders 23 whenever the belt is straightened out, (as shown in Fig. 7), and serve to hold all of the interfitting and interlocking units in the same plane (see horizontal portion of the belt in Fig. 1).

The springs 10—10' may be continuous strips, or simply plates broad enough to safely overlap the joints between the treads 9 and 26.

In Figs. 9 and 10 is shown still another modification of the tractor belt, which comprises a number of interfitting and interlocking sections 27. Each section 27 consists of a narrow web 28 of keystone shape in side elevation, its broad base edge being secured to a flexible belt or shoe 29. The webs 28 are preferably disposed in line with each other on the shoe 29, and when they are curved around the wheel, as 3'', the adjacent vertical edges meet, as best seen at 28' in Fig. 9. At the opposite sides near the top of the web 28, is disposed horizontally arranged arms 30—31, preferably integral, both of which project beyond the web. The arms 30 are employed for filling the gaps between the narrow tops of the webs when the belt is straightened out and thus provide a continuous level bearing or track surface 32 for the wheels to roll upon. The arms 31 are arranged in a lower plane and these engage the underside of an integral part 33 when the belt is straightened out, and when the belt is curved around the wheel, the arms 31 move away from the shoulders 33, and engage an angular projecting part 34, which is disposed near the bottom of the adjacent webs 28. By the modified construction referred to, a relatively light but strong and simple tractor belt is provided.

Having thus described my invention, what I claim as new and desire to secure by Letters Patent, is—

1. A tractor belt including interlocking sections having tread portions extending transversely, flexible means for connecting the adjacent sections, an upright web mounted upon each tread portion having a slot and a pin for interlocking with adjacent webs, and an angular rail portion upon each web adapted to support the wheels of a vehicle.

2. A tractor belt, comprising overlapping and interlocking units, each unit including a transversely disposed tread, a web mounted on said tread having pointed ends extending beyond the lateral edges of said tread, oppositely disposed flanges carried by said web and engaged by said pointed ends of the adjacent webs, and angular track portions disposed above the said flanges.

3. A tractor belt comprising interlocking units, each unit including a transversely disposed tread, a web mounted on said tread having pointed ends extending beyond the lateral edges of said tread, oppositely disposed flanges carried by said web adapted to be engaged by said pointed ends, angular track portions disposed above said flanges, said track portion of one unit adapted to overlap the track portions of the adjacent units, and means for flexibly joining said units together.

4. A tractor belt including a plurality of interlocking units having tread portions extending transversely, springs for connecting said treads together, an upright web mounted on each tread portion having a slot and a pin for interlocking with two adjacent webs, and a track portion surmounting each web adapted to support grooved wheels of a vehicle.

5. A tractor belt comprising a plurality of units flexibly joined together to form an endless belt, each unit consisting of a tread, a web, and a track portion for engaging and supporting the wheels of a vehicle, each web having a slot and a pin for interlocking with adjacent webs disposed on each side thereof, and each web having laterally projecting flanges engaged by the opposite ends of the adjacent webs, and flexible parts for connecting said treads together.

6. A tractor belt comprising a plurality of units, each unit consisting of a tread, a web disposed diagonally across the top of each tread, each web supporting an angular track portion and having laterally projecting flanges disposed between the web and said track portion, each web having an oblique slot and a pin carried by each web adapted to engage a slot in the adjacent web for limiting the flexing of the belt when encircling a wheel and for preventing the separation of said units.

In testimony whereof I affix my signature.

HUGH McGUCKIN.